United States Patent [19]

Mahlich et al.

[11] Patent Number: 4,852,474
[45] Date of Patent: Aug. 1, 1989

[54] ESPRESSO MACHINE WITH CAPPUCCINO MAKING ATTACHMENT

[75] Inventors: Gotthard C. Mahlich, Kronberg; Michael Borgmann, Solingen, both of Fed. Rep. of Germany

[73] Assignee: Robert Krups Stiftung & Co. KG, Solingen, Fed. Rep. of Germany

[21] Appl. No.: 242,715

[22] Filed: Sep. 9, 1988

Related U.S. Application Data

[63] Continuation-in-part of Ser. No. 100,339, Sep. 23, 1987, Pat. No. 4,800,805.

[30] Foreign Application Priority Data

Sep. 24, 1986 [DE] Fed. Rep. of Germany ....... 3632375
Dec. 24, 1986 [DE] Fed. Rep. of Germany ....... 3644519
Sep. 12, 1987 [DE] Fed. Rep. of Germany ....... 3742203

[51] Int. Cl.⁴ .............................................. A47J 31/40
[52] U.S. Cl. ..................................... 99/293; 99/323.1; 261/121.1; 261/DIG. 76
[58] Field of Search ................ 99/279, 300, 295, 293, 99/294, 323.1, 302 R, 323, 299; 426/433; 126/5; 261/DIG. 7, 121.1

[56] References Cited

U.S. PATENT DOCUMENTS

| | | | |
|---|---|---|---|
| 4,204,465 | 5/1980 | Knecht | 99/293 |
| 4,502,371 | 3/1985 | Lascio | 99/293 |
| 4,632,024 | 12/1986 | Cortese | 99/293 |
| 4,644,856 | 2/1987 | Borgmann | 99/294 |
| 4,662,993 | 5/1987 | Schaefer | 261/DIG. 7 |
| 4,757,753 | 7/1988 | Pandolfi | 99/295 |

*Primary Examiner*—Robert W. Jenkins
*Attorney, Agent, or Firm*—Peter K. Kontler

[57] ABSTRACT

An espresso machine wherein a steam supplying first conduit is separably coupled to a second conduit having an air admitting inlet and an air discharging outlet. When the first conduit admits steam into the second conduit between the inlet and the outlet, such steam draws atmospheric air by way of the inlet and the resulting steam-air mixture is discharged by way of the outlet to frothe milk in a vessel into which the outlet of the second conduit extends. The rate of admission of air into the inlet of the second conduit is regulated by a valving element which is mounted on the second conduit and can be rotated by a handle so as to move a hole of the valving element relative to the inlet and to thus alter the cross-sectional area of the path for the flow of air into the second conduit. If the inlet of the second conduit is completely sealed from the atmosphere, the outlet discharges only steam which can be used to heat cups prior to pouring of espresso coffee.

23 Claims, 2 Drawing Sheets

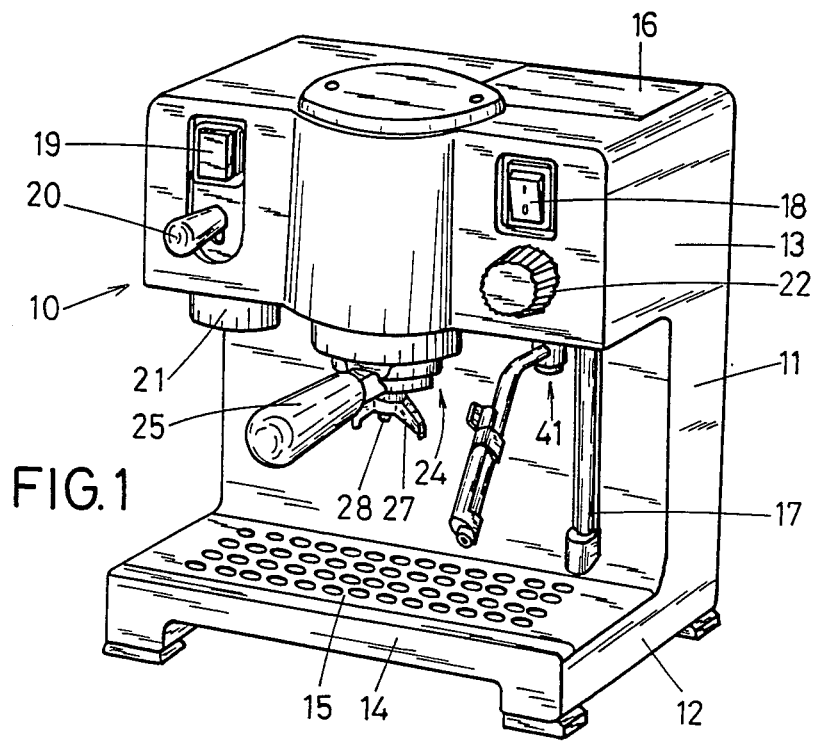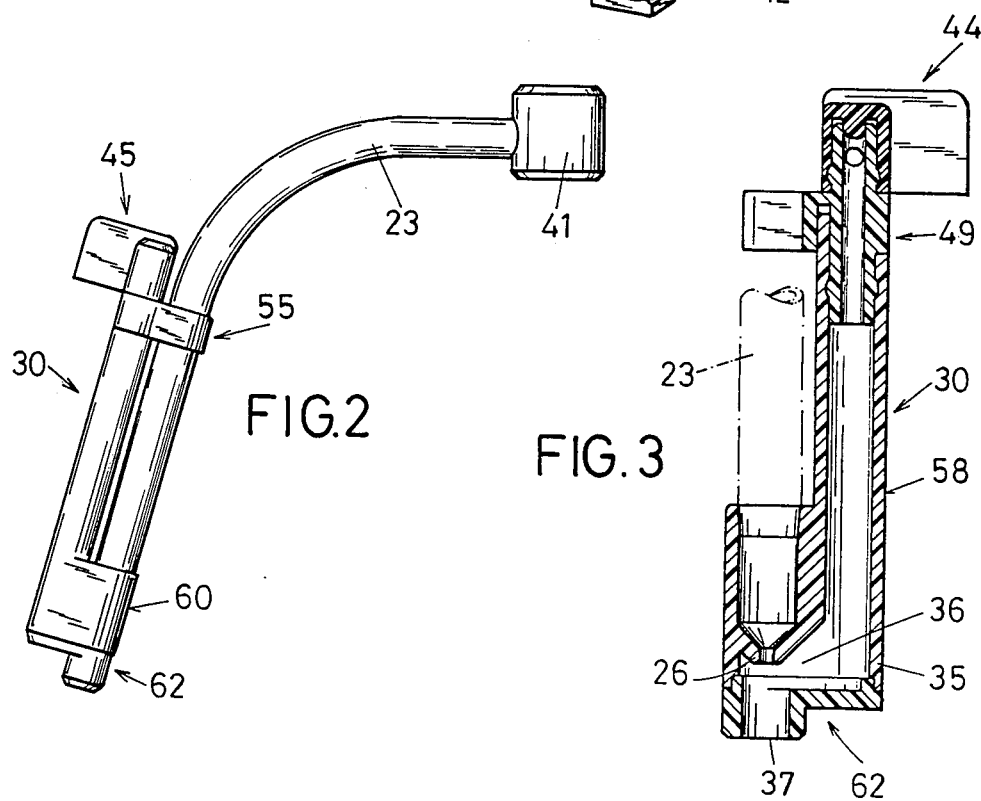

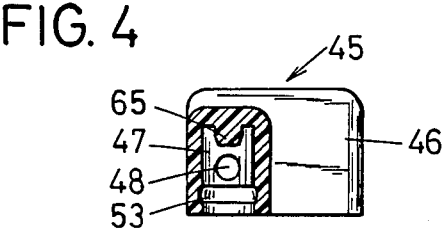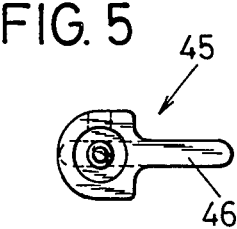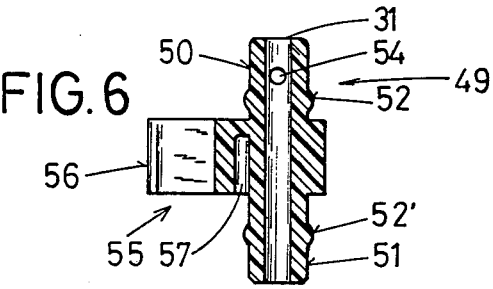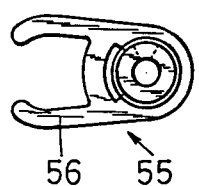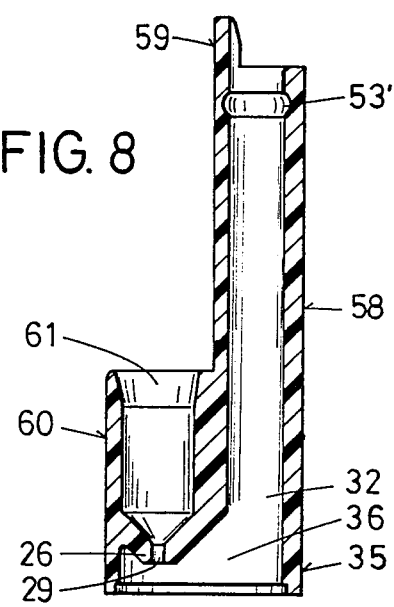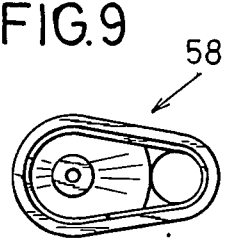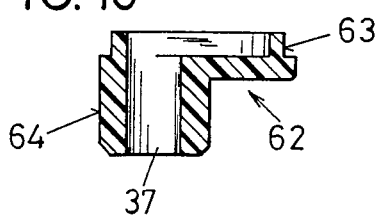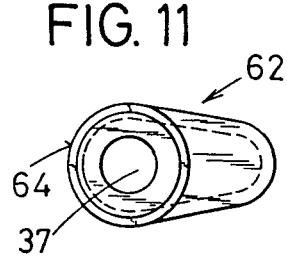

ESPRESSO MACHINE WITH CAPPUCCINO MAKING ATTACHMENT

CROSS-REFERENCE TO RELATED CASE

This is a continuation-in-part of our commonly owned copending patent application Ser. No. 100,339 filed Sept. 23, 1987 for "Espresso machine with cappuccino making attachment", now U.S. Pat. No. 4,800,805 granted 01/31/89.

The espresso machine of the present invention is similar to that shown in the commonly owned copending design patent application Ser. No. 054,585 filed May 27, 1987 for "Combined espresso and cappuccino making machine".

BACKGROUND OF THE INVENTION

The present invention relates to espresso machines, and more particularly to improvements in espresso machines of the type capable of making cappuccino coffee.

It is well known to use an espresso machine for the making of cappuccino, i.e., a beverage containing coffee and frothed milk. A vessel, such as a cup, containing a plurality of milk is placed onto the base of an espresso machine at a level below the customary conduit which is provided with a steam discharging nozzle at its lower end. The nozzle is caused to dip into the body of milk and discharges steam. In order to promote the admission of air into the body of milk, the vessel is moved up and down relative to the nozzle so as to speed up the frothing process. Such procedure is time-consuming and requires a certain amount of expertise, namely proper positioning of the nozzle with reference to the vessel and a proper frequency and amplitude of up and down movements of the vessel. In addition, the just described mode of frothing milk in an espresso machine can cause injury or shock to the operator, for example, if the vessel contains a relatively small quantity of milk and the vessel is lowered to a level at which steam can escape above or close to the upper level of milk so that droplets of milk are sprayed all over and around the espresso machine including the garment of the operator.

It was further proposed to surround the nozzle of the steam supplying conduit with a cylindrical jacket through which air is drawn in response to opening of the valve which initiates the discharge of hot steam. The jacket has holes which are provided in its periphery and serve to admit air which is then sucked down the jacket and out at the lower end to penetrate into the body of milk. The jacket is further formed with at least one inlet for milk so that the lower part of the jacket contains a mixture of steam, air and milk. Such mixture leaves the conduit by way of the orifice in the nozzle and forms a froth. The just described machine exhibits the advantage that it is not necessary to move the vessel relative to the steam supplying conduit and that frothing of milk requires a minimum of expertise. On the other hand, the provision of a cylindrical jacket with openings for admission of air and milk contributes to the initial cost of the machine, especially if the jacket is to be removable so as to allow for convenient cleaning on a daily basis or at longer or shorter intervals.

The copending patent application Ser. No. 100,339 discloses an espresso machine with an attachment for the making of cappuccino wherein the attachment has a pipe with an open air admitting inlet at its upper end and an open air discharging outlet at its lower end. The steam conduit of this machine has an orifice for steam at its lower end, and the outlet of the pipe is positioned in such a way that steam issuing from the orifice draws air into the pipe by way of the inlet and out by way of the outlet to mix with steam and to frothe a quantity of milk when the resulting mixture is admitted into a body of milk in a cup or another vessel. The pipe can be a separately produced part which is separably and adjustably or integrally connected to the conduit. The copending application further discloses that the conduit can be provided with an integral portion which serves as an air supplying pipe and that it is possible to provide a coupling to separably connect the upper end of the conduit to the source of steam. An extension can be provided to allow mixing of air with steam before the resulting mixture is caused to enter into and to frothe a supply of milk. The extension can constitute an integral part of the conduit or a separately produced part which has a funnel-shaped portion surrounding a conical portion of the steam discharging nozzle of the conduit. The copending patent application further discloses that the inlet of the pipe can be provided with means for regulating the flow of air into the pipe by way of such inlet. The flow regulating means includes a valve, particularly a valve with a rotary valving element.

An advantage of the just described espresso machine is that suction in the relatively small funnelshaped portion of the extension suffices to draw air into the inlet of the pipe in a highly predictable manner. Moreover, the internal surfaces of the extension are not contacted by milk because the inflowing steam prevents milk from penetrating into the extension. This not only reduces the likelihood of contamination of the extension with milk but also prevents milk from clogging the relatively narrow passages for steam, air and mixture of air and steam. The purpose of the flow regulating means is to ensure that the user can conform the rate of admission of air to momentary requirements of the machine.

OBJECTS OF THE INVENTION

An object of the invention is to provide an espresso machine wherein frothing of milk with hot steam can be regulated in a simple way and with a high degree of accuracy, predictability and reproducibility.

Another object of the invention is to provide an espresso machine with a simple, compact and inexpensive cappuccino making attachment which can be readily cleaned and can be permanently or separably assembly with the steam supplying conduit.

An additional object of the invention is to provide a novel and improved steam supplying conduit for use in an espresso machine which is designed for the making of cappuccino.

Still another object of the invention is to provide an espresso machine which can be used to froth milk by a skilled attendant in a commercial establishment as well as by an unskilled person without any danger of injury and/or contamination of the area around the machine.

An additional object of the invention is to provide a novel and improved method of converting an espresso machine into an appliance which can froth milk for used in the preparation of cappuccino.

Another object of the invention is to provide a simple, compact and inexpensive attachment which can be used in combination with an existing espresso machine to make frothed milk preparatory to the making of a cappuccino.

A further object of the invention is to provide the machine with novel and improved means for regulating the frothing operation.

An additional object of the invention is to provide simple, compact and inexpensive regulating means which can be attached to existing or to specially designed steam supplying conduits.

SUMMARY OF THE INVENTION

The invention is embodied in an espresso machine which comprises a source of steam, steam supplying first conduit means having at least one steam discharging orifice, air supplying second conduit means having at least one air-admitting inlet which is remote from the orifice as well as at least one air-discharging outlet adjacent the orifice so that steam which issues from the orifice draws air from the second conduit means by way of the outlet, and means for regulating the flow of air into the inlet of the second conduit means. The regulating means comprises a valving element which is movable with reference to the second conduit means between a plurality of positions in each of which the inlet communicates with the surrounding atmosphere to a different extent.

The inlet can include a transversely extending first hole in the second conduit means and the valving element is preferably turnable with respect to the second conduit means and has a second hole which communicates with the surrounding atmosphere and is movable relative to the first hole in response to rotation of the valving element relative to the second conduit means to thereby establish different paths for the flow of air into the second conduit means by way of the second and first holes.

The machine preferably further comprises means for separably coupling the regulating means to one of the conduit means. For example, the regulating means can be coupled to and can rotate about the second conduit means and can be provided with a handle which can be engaged by hand to facilitate rotation of the regulating means. The second conduit means can include an end portion which is provided with the aforementioned first hole and is spaced apart from the outlet of the second conduit means, and the regulating means can be provided with a blind hole for the end portion of the second conduit means. The second hole communicates with the surrounding atmopshere and with the blind hole to establish the aforementioned different paths for the flow of air into the second conduit means in response to rotation of the regulating means about the second conduit means. The coupling means can comprise complementary male and female coupling elements one of which is provided in the blind hole and the other of which is provided on the end portion of the second conduit means.

The second conduit means preferably includes a plurality of separably connected sections including a first section which includes the aforementioned end portion and is thus provided with the inlet and carries the regulating means, and a second section which is provided with the outlet. The second conduit means preferably further includes an intermediate section between the first and second sections. Means is provided for separably securing the sections of the second conduit means to each other. Such securing means can include means for frictionally coupling at least one of the sections to at least one other section. The means for separably coupling the regulating means to one of the conduit means is preferably designed to separably couple the regulating means to the first section of the second conduit means so that the regulating means surrounds at least the end portion of the second conduit means and the (first) hole (inlet) of the second conduit means. The second hole establishes different paths for the flow of air into the first hole in response to rotation of the regulating means to different angular positions relative to the first section of the second conduit means. The first section preferably includes a first part (the aforementioned end portion of the second conduit means) which is provided with the first hole and is coupled to the regulating means, and a second part which is separably coupled with another section of the second conduit means, preferably with the intermediate section. The first part is disposed at a level above the second part of the first section, at least when the machine is in use.

The machine can further comprise means for separably attaching the second conduit means to the first conduit means. Such attaching means is preferably designed to attach the first section of the second conduit means to the first conduit means. In accordance with a presently preferred embodiment, the attaching means comprises a plurality of resilient prongs which are integral with the second conduit means and straddle the first conduit means.

In order to ensure that the outlet of the second conduit means will be properly oriented relative to the orifice of the first conduit means, the second conduit means preferably further comprises means for preventing rotation of its sections relative to each other, e.g., to prevent rotation of the first section relative to the intermediate section and second section. To this end, the first section or the intermediate section can be provided with at least one projection which is receivable in a complementary socket of the other of these sections. For example, the socket can include or constitute an axially parallel blind hole in the first section of the second conduit means.

The intermediate section of the second conduit means can include or constitute a hollow extension which is disposed between the inlet and the outlet and whose interior receives steam from the orifice of the first conduit means. The second section of the second conduit means is separably secured to the extension adjacent the orifice and is provided with the outlet. The second section can include a first portion which is secured to the extension and a second portion which is provided with the outlet. The cross-sectional area of the first portion of such second section can exceed the cross-sectional area of the second portion.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of an espresso machine which can be converted into a cappuccino maker;

FIG. 2 is an enlarged side elevational view of an attachment which can be used with the steam supplying conduit of the espresso machine shown in FIG. 1;

FIG. 3 is an enlarged central sectional view of the attachment, a portion of the steam supplying conduit being indicated by phantom lines;

FIG. 4 is an enlarged partly elevational and partly central sectional view of the regulating means;

FIG. 5 is a bottom plan view of the regulating means of FIG. 4;

FIG. 6 is a central sectional view of the first section of the second conduit means;

FIG. 7 is a bottom plan view of the first section;

FIG. 8 is a central sectional view of the intermediate section of the second conduit means;

FIG. 9 is a bottom plan view of the intermediate section;

FIG. 10 is a central sectional view of the second section of the second conduit means; and FIG. 11 is a bottom plan view of the second section.

DESCRIPTION OF PREFERRED EMBODIMENTS

FIG. 1 shows certain parts of an espresso machine 10 which is provided with a novel and improved attachment for the frothing of milk preparatory to the making of milk coffee known as cappuccino. The parts which serve to connect the current-consuming units of the machine 10 to an outlet or to another source of electrical energy have been omitted for the sake of clarity and simplicity. All parts which are not specifically shown but are necessary for proper operation of the machine 10 can be of any conventional design. For example, the construction of the machine 10 can be similar to or identical with that of the electric espresso/cappuccino makers Nos. 966 and 933 which are distributed by the assignee of the present application.

The machine 10 comprises a housing or support including an upright median section 11, a lower section or base 12 which is provided with legs and carries the section 11 at its rear end, and an enlarged upper section or head 13 at the upper end of the section 11. The base 12 extends forwardly beyond the upright section 11 and has a recess for a removable collecting tray 14 which gathers spilled coffee, water and/or milk and is normally overlapped by a sieve-like cover 15 serving as a miniature table for cups or other types of vessels. The cover 15 and the tray 14 can be lifted off the base 12 for periodic cleaning and evacuation of the contents of the try.

The top wall of the upper section 13 of the housing of the machine 10 has a pivotable or otherwise movable door 16 which can be moved to an open position so as to allow for introduction of a supply of water, e.g., by lifting the entire machine 10 off a table top or counter top and placing the opening which is exposed in response to movement of the door 16 to open position beneath the cold-water faucet in a sink or the like. The section 13 constitutes a source of fresh water as well as a source of hot steam which is obtained in response to heating of water that is drawn from the chamber beneath the door 16. If desired, the chamber beneath the door 16 can be provided in a separable portion of the section 13, i.e., in a discrete water tank which can be detached from the remaining portion of the section 13 for convenient cleaning or refilling with fresh water. The rear side of the water tank can be provided with a pivotable handle (not seen in the view of FIG. 1) so as to allow for convenient manipulation of the tank during removal from the remaining portion of the section 13, during filling and/or cleaning and during reattachment to the remaining portion of the section 13. The median section 11 of the housing of the machine 10 is provided with a front view water level indicator 17 which enables the operator to immediately ascertain the quantity of water in the tank.

A master (on-off) switch 18 at the front side of the section 13 is installed at a level above a rotary steam regulator knob 22. The switch 18 must be closed in order to connect the energy source with a heat-up system which forms hot steam. When the section 13 contains a minimum required quantity of hot steam, a control light 19 at the front side of the upper section 13 lights up or is turned off. An espresso metering lever 20 is installed beneath the control light 19 and serves to initiate the dispensing of a selected quantity of espresso coffee into a cup or another suitable vessel which is located at a level above the cover 15 to receive a selected quantity of espresso coffee. The construction of parts which are controlled by the lever 20 is known and forms no part of the present invention.

The section 13 of the housing of the machine 10 further supports a customary substantially cyindrical coffee tamper 21 which can force pulverulent coffee into the filter in a simple and effective way. The knob 22 can be rotated between a zero (sealing) position, through an infinite number of intermediate positions, and a second end position to effect a discharge of hot steam at an intermediate or at a maximum rate by way of a pivotable or swiveling steam supplying conduit 23 which is coupled to the section 13 (i.e., to the source of steam) at a location to the left of the water level indicator 17. Steam which issues from the orifice 29 of the nozzle 26 (FIG. 2) at the lower end of the conduit 23 can be used to heat cups which are about to receive espresso coffee. In addition, the conduit 23 can cooperate with the improved cappuccino making attachment to froth milk in a vessel, such as the vessel 34 shown in FIG. 2 of the copending patent application Ser. No. 100,339.

FIG. 1 further shows a customary filter carrier or holder 24 which is mounted in the central portion of the section 13 and defines a chamber for a filter. The chamber of the filter carrier 24 is preferably surrounded by metal or another heat-conducting material. On the other hand, a handle 25 at the lower end of the filter carrier 24 is made of a material which is a poor conductor of heat. The carrier 24 further comprises a connector which is disposed between the filter chamber and the handle 25 and can include a bayonet mount to facilitate rapid connection of the carrier 24 to or rapid disconnection of such carrier from the section 13. An espresso dispensing spout 27 is attached to the filter carrier 24 by a screw 28 or another suitable fastener. The arrangement may be such that the spout 27 can discharge two streams of espresso coffee into two adjoining cups on the cover 15.

The attachment is shown in detail in FIGS. 2 to 11. It comprises essentially a second conduit 30 which is separably secured to the steam supplying conduit 23 by an attaching device 55, and a regulating device 44 which serves to select the rate of flow of atmospheric air into the conduit 30 and to thus control the rate of frothing milk when the outlet 37 (FIGS. 3 and 10) of the conduit 30 is caused to extend into a body of milk in a suitable vessel, such as the vessel 34 shown in FIG. 2 of the copending patent application Ser. No. 100,339. The upper end portion of the steam supplying conduit 23 is separably secured to the source of steam in the upper section 13 of the housing of the machine 10 by a suitable coupling 41 so that it can be readily detached from the housing for the purpose of cleaning or inspection. The coupling 41 enables the conduit 23 to turn about a vertical or substantially vertical axis in order to facilitate the introduction of the lower part of the attachment into a vessel as well as extraction of such lower part from the vessel upon completion of the frothing operation. If the conduit 23 and the attachment are used solely to heat a cup preparatory to pouring of espresso coffee into the cup, the inlet 54 (FIG. 6) of the conduit 30 is sealed from the atmosphere by the regulating device 44 so as to ensure that the outlet 37 will discharge only hot steam.

FIG. 3 shows that the nozzle 26 and its orifice 29 can actually form integral parts of an intermediate section 58 of the air supplying conduit 30, i.e., that such nozzle need not be provided at the lower end of the steam supplying conduit 23. However, it is equally within the purview of the invention to design the improved attachment in such a way that the orifice 29 is provided in the lower end portion of the conduit 23. The intermediate section 58 of the conduit 30 has an extension 35 which surrounds the nozzle 29 at a level above the outlet 37 and below the inlet 54 of the conduit 30. The intake end 32 of the extension 35 receives atmospheric air from a first or top section 49 of the conduit 30, and the latter further comprises a second or lowermost section 62 which is separably secured to the extension 35 of the intermediate section 58. The character 36 denotes the internal space of the extension 35.

The regulating device 44 includes or constitutes a valving element 45 which is rotatably mounted on and surrounds the upper part 50 of the section 49 and has a handle 46 which can be grasped by hand to change the angular position of the regulating device 44 and hence the rate of flow of atmospheric air into the internal space 36 of the extension 35 when the conduit 23 is caused to discharge hot steam. The valving element 45 has a blind hole or bore 47 beneath a plug 65 which enters the open upper end 31 of the top part 50 of the section 49 when the latter is properly coupled with the valving element 45. The inlet 54 of the conduit 30 is a transversely extending hole which is provided in the top part 50 of the section 49 and can register, either entirely, in part or not at all, with a similar transverse hole 48 which is provided in the inverted cup-shaped portion of the valving element 45 and communicates with the blind hole 47. The means for separably coupling the valving element 45 to the top part 50 of the section 49 of the conduit 30 comprises an annular bead (male coupling element) 52 which is provided at the exterior of the top part 50 and can snap into a complementary circumferentially complete groove (female coupling element) 53 in the surface surrounding the blind hole 47 of the valving element 45. The groove 53 is provided in the external surface of the top part 50 if the bead 52 is provided in the blind hole 47. By grasping the handle 46 and by rotating the valving element 45 about the axis of the section 49, the operator of the machine 10 can increase or reduce the crosssectional area of the path for the flow of atmospheric air from the hole 48 into the hole 54 and thereupon through the sections 49, 58, 62 toward and into the outlet 37. Such air is mixed with steam in the internal space 36 of the extension 35 of the intermediate section 58 prior to issuing from the conduit 30 by way of the outlet 37 to ensure rapid and pronounced frothing of milk in the vessel into which the lower end portion of the improved attachment extends.

Each of the four components (44, 49, 58, 62) of the attachment which are shown in FIGS. 4 to 11 can be made of a single piece of suitable plastic material. These four components are shown in FIGS. 4 to 11 above each other in the order they must or can be assembled prior to attachment to the conduit 23. Thus, the regulating device 44 is disposed at a level above the first section 49 of the conduit 30, the section 49 is disposed above the intermediate section 58, and the section 58 is disposed above the second section 62.

The second or lower part 51 of the section 49 has an external bead 52' constituting the male component of the means for separably securing the section 49 to the intermediate section 58. The later has an internal surface provided with a circumferentially complete groove 53' constituting the female component of the securing means. The upper end portion of the intermediate section 58 has an axially parallel projection 59 which is receivable in a complementary socket 57 (e.g., an axially parallel blind hole) of the section 49 to ensure that the sections 49 and 58 cannot rotate relative to each other, e.g., that the section 49 cannot be rotated by the regulating device 44 when the handle 46 is held by hand to turn the valving element 45 about the upper part 50 of the section 49 in order to change the cross-sectional area of the path for the flow of air into the inlet 54.

The median part of the section 49 includes the attaching device 55 which serves to separably attach the conduit 30 and the regulating device 44 to the steam supplying conduit 23. The attaching device 55 has two resilient prongs or claws 56 which are integral with the section 49 and straddle the adjacent portion of the conduit 23 while the open lower end of the conduit 23 extends into an enlarged portion 60 of the intermediate section 58 at a level above the nozzle 26 and its orifice 29. The enlarged portion 60 is open at the top (as at 61) to permit insertion of the lower end portion of the conduit 23. The separable connection between the conduits 23 and 30 can be terminated by sliding the conduit 30 relative to the conduit 23 and/or vice versa so that the end portion of the conduit 23 is withdrawn from the enlarged portion 60 of the section 58, and by thereupon pulling the conduit 23 and the section 49 apart so that the elastic prongs 56 yield and release the adjacent portion of the conduit 23.

The valving element 45 can be caused to assume a first position in which the hole 54 is in full register with the hole 48 so that the internal space 36 of the extension 35 of the section 58 receives atmospheric air at a maximum rate in response to admission of steam from the section 13 of the housing of the machine 10 into the conduit 23, a second position in which the holes 48 and 54 are sealed from each other (the conduit 23 can then discharge steam to rapidly heat a cup prior to admission of espresso coffee thereinto), and a plurality of intermediate positions in each of which the valving element 45 defines a different path for the admission of air into the internal space 36 of the section 58.

The lower end of the extension 35 of the intermediate section 58 is open and receives the upper portion 63 of the second section 62. The lower portion 64 of the section 62 is a relatively short tubular component which is provided with the outlet 37 (disposed beneath the orifice 29 of the nozzle 26) and whose crosssectional area is smaller than that of the upper portion 63. The portion 63 can be held in the extension 35 of the intermediate section 58 exclusively by friction. However, it is equally within the purview of the invention to provide the sections 58, 62 with male and female detent elements or analogous securing means to establish a more reliable connection between such sections.

The operation of the attachment is as follows:

The machine 10 is operated in the customary way so as to produce steam which accumulates in the section 13 of the housing and is used for the making of espresso coffee. When the control light 19 lights up or is extinguished, the operator knows that the section 13 contains an adequate supply of steam and the operator can turn the knob 22 so as to admit steam into the conduit 23 which is secured to the housing section 13 by the coupling 41. Such steam flows through the orifice 29 of the nozzle 26 and into the internal space 36 of the extension 35 to draw into the intermediate section 58 atmospheric air at a rate corresponding to the selected angular position of the valving element 45 relative to the first section 49 of the conduit 30. The resulting air-steam mixture flows into the outlet 37 to be admitted into a body of milk in a suitable vessel into which the lower end portion of the attachment including the conduit 30 and the regulating device 44 extends. The extent to which milk in the vessel is frothed can be regulated by the simple expedient of changing the angular position of the knob 22 and/or by changing the angular position of the valving element 45.

An important advantage of the improved attachment is that milk cannot penetrate into the internal space 36 of the extension 35 even if the second section 62 is caused to dip into a body of milk. Thus, the surfaces surrounding the internal space 36 and the orifice 29 cannot be coated with milk. This ensures that the rate of flow of a mixture of steam and air into and beyond the outlet 37 cannot be altered by deposits of milk in the interior of the attachment.

As mentioned above, the valving element 45 can be moved between a plurality of positions in one of which the hole 48 is sealed from the hole 54 and in another of which the hole 48 can be maintained in full register with the hole 54. Furthermore, the valving element 45 can be moved to a practically infinite number of additional positions in each of which the valving element establishes a different path for the flow of atmospheric air into the hole 54 and hence into the sections 49, 58 and 62 of the conduit 30.

An important advantage of the improved attachment is that its parts can be mass-produced at a low cost. In addition, the conduit 30 and the regulating device 44 can be readily attached to or detached from the steam supplying conduit of an existing espresso machine. The regulating device 44 is so simple that it can be properly manipulated by an expert as well as by an unskilled person. At the present time, the regulating device 44 is preferably mounted for rotation on the upper end portion 50 of the conduit 30; however, it is equally possible to mount the device 44 or an analogous regulating device for reciprocatory or combined translatory and angular movement with reference to the conduit 30. It is even possible to design the conduit 30 in such a way that a section thereof can be moved relative to the regulating device in order to change the cross-sectional area of the path for the flow of air into the conduit 30.

The regulating device 44 can be simply slipped onto or off the section 49 of the illustrated conduit 30 without resorting to any tools. This facilitates cleaning of the attachment. If desired, the section 49 and the regulating device 44 can be provided with suitable indicia so as to enable the operator to ascertain the selected rate of air flow into the conduit 30. For example, the valving element 45 can carry an index or marker which is movable along an arcuate scale at the exterior of the lower part 51 of the section 49.

While it is possible to provide the conduit 30 and the valving element 45 with coupling means which are more complex than the illustrated coupling means 52, 53, the coupling means 52, 53 is preferred at this time because its elements can be formed at the time of making the section 49 and the valving element 45. This contributes to a reduction of the cost of the attachment.

The assembling of the conduit 30 from several sections is preferred on the ground that this also contributes to lower cost of the conduit 30 and of the entire attachment. Simple securing means which operate by friction and are used to separably hold the neighboring sections of the conduit 30 together are preferred at this time in order to reduce the cost and to simplify the assembly and dismantling of the conduit 30.

The cross-sectional area of the passage for the flow of air in the conduit 30 can be selected practically at will. In the embodiment which is shown in FIGS. 6 to 11, the cross-sectional area of the passage in the section 49 is constant from the hole 54 to the lower end of this section, the cross-sectional area of the passage in the section 58 is constant from the upper end to the internal space 36 of the extension 35, and the crosssectional area of the passage in the lower portion 64 of the section 62 is constant from end to end.

The illustrated attaching device 55 with two spreadable prongs or claws 56 constitutes a very simple and inexpensive means for separably coupling the conduit 30 to the conduit 23. It is clear that such attaching device can be provided on the section 58 or that the attaching device can comprise two parts, one on the section 49 and the other on the section 58. Some flexing of the prongs 56 in order to attach the section 49 to or to detach it from the conduit 23 necessitates the exertion of a negligible effort.

A separable connection between the sections 58 and 62 of the conduit 30 is advantageous and desirable in order to ensure that the section 62 can be cleaned at desired intervals, even at a time when the section 58 requires no cleaning at all. Moreover, such connection renders it possible to inspect the surface bounding the internal space 36 of the extension 35 in order to ascertain whether or not such surface necessitates cleaning.

The improved attachment is susceptible of many additional modifications. For example, the number of sections which together form the conduit 30 can be increased or reduced, and the configuration of some or all of these sections can depart from the configurations shown in FIGS. 6 to 11. It is further possible to change the means for attaching the conduit 30 to the conduit 23, to change the means for separably securing the sections of the conduit 30 to each other, to change the means for coupling the regulating device 44 to the conduit 30 and/or to change the manner in which the discharge end of the conduit 23 is received in the intermediate section 58. Still further, the espresso machine 10 can be replaced with any other available espresso making machine which is equipped with means for discharging steam so that such discharging means can carry an element of the improved attachment.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An expresso machine comprising a source of steam; steam supplying first conduit means having at least one steam discharging orifice; air supplying second conduit means having at least one air-admitting inlet and at least one air-discharging outlet adjacent said orifice so that steam which issues from said orifice draws air from said second conduit means by way of said outlet; and means for regulating the flow of air into said second conduit means by way of said inlet, said regulating means comprising a valving element movable with reference to said second conduit means between a plurality of positions in each of which said inlet communicates with the surrounding atmosphere to a different extent.

2. The machine of claim 1, wherein said inlet includes a transversely extending first hole in said second conduit means and said valving element is turnable with respect to said second conduit means and has a second hole which communicates with the surrounding atmosphere and is movable relative to said first hole in response to rotation of said valving element relative to said second conduit means to thereby establish different paths for the flow of air into said second conduit means by way of said holes.

3. The machine of claim 1, further comprising means for separably coupling said regulating means to one of said conduit means.

4. The machine of claim 3, wherein said regulating means is coupled to and is rotatable about said second conduit means and comprises a handle which can be engaged by hand to facilitate rotation of said regulating means.

5. The machine of claim 4, wherein said second conduit means comprises an end portion which is spaced apart from said outlet and has a transversely extending hole constituting said inlet, said regulating means having a bind hole for said end portion and a transverse hole communicating with the surrounding atmosphere and with said blind hole and being arranged to establish different paths for the flow of air into the hole of said end portion in response to rotation of said regulating means about said second conduit means.

6. The machine of claim 5, wherein said coupling means comprises complementary male and female coupling elements one of which is provided in said blind hole and the other of which is provided on said end portion.

7. The machine of claim 1, wherein said second conduit means includes a plurality of separably connected sections including a first section which is provided with said inlet and carries said regulating means and a second section which is provided with said outlet.

8. The machine of claim 7, wherein said second conduit means further comprises an intermediate section between said first and second sections.

9. The machine of claim 7, further comprising means for separably securing said sections of said second conduit means to each other.

10. The machine of claim 9, wherein said securing means includes means for frictionally coupling at least one of said sections to at least one other section.

11. The machine of claim 7, further comprising means for separably and movably coupling said regulating means to said first section so that the regulating means surrounds said first section, said inlet including a first hole in said first section and said regulating means having a second hole which communicates with the surrounding atmosphere and establishes different paths for the flow of air into said first hole in response to movement of said regulating means relative to said first section.

12. The machine of claim 11, wherein said first section includes a first part which is provided with said first hole and is coupled to said regulating means, and a second part which is separably coupled with another of said sections.

13. The machine of claim 12, wherein said first part is disposed at a level above said second part.

14. The machine of claim 1, further comprising means for separably attaching said second conduit means to said first conduit means.

15. The machine of claim 14, wherein said second conduit means includes a plurality of sections one of which is provided with said inlet, said attaching means including means for attaching said one section to said first conduit means.

16. The machine of claim 14, wherein said attaching means is integral with said second conduit means.

17. The machine of claim 16, wherein said attaching means comprises a plurality of resilient prongs arranged to straddle said first conduit means.

18. The machine of claim 1, wherein said second conduit means includes a plurality of separable sections and means for separably securing said sections to each other, said sections including a first and a second section and said second conduit means further comprising means for preventing rotation of said first and second sections relative to each other.

19. The machine of claim 18, wherein said rotation preventing means comprises at least one projection provided on one of said first and second sections and a socket for said at least one projection in the other of said first and second sections.

20. The machine of claim 19, wherein said one section is provided with said inlet and said socket includes a blind hole in said one section.

21. The machine of claim 1, wherein said second conduit means comprises a hollow extension intermediate said inlet and said outlet, said orifice being arranged to discharge steam into said extension and said second conduit means further comprising a section which is separably secured to said extension adjacent said orifice and is provided with said outlet.

22. The machine of claim 21, wherein said section includes a first portion which is secured to said extension and a tubular second portion which is provided with said outlet.

23. The machine of claim 22, wherein the cross-sectional area of said second portion is smaller than the cross-sectional area of said first portion.

* * * * *